United States Patent [19]
Lorenzi

[11] 3,786,346

[45] Jan. 15, 1974

[54] METHOD FOR DETECTING DEFECTS USING MAGNETIC PARTICLES IN A VISCOUS FLUID THAT RESTRICTS THEIR MOBILITY

[75] Inventor: Donald E. Lorenzi, Des Plaines, Ill.

[73] Assignee: Magnaflux Corporation, Chicago, Ill.

[22] Filed: Mar. 6, 1973

[21] Appl. No.: 338,456

[52] U.S. Cl. ............................ 324/38, 252/62.52
[51] Int. Cl. ............................................ G01r 33/12
[58] Field of Search ......................... 324/38, 43 R; 252/62.52, 62.55

[56] References Cited
FOREIGN PATENTS OR APPLICATIONS
475,383  11/1937  Great Britain ....................... 324/38

Primary Examiner—Robert J. Corcoran
Attorney—Benjamin H. Sherman et al.

[57] ABSTRACT

Method and composition for detecting defects in a magnetizable test piece which involves applying over the surface of the test piece a relatively viscous slurry of ferromagnetic flakes, preferably in an oily medium, the slurry being sufficiently viscous to restrict lateral mobility of the flakes while permitting rotary movement of the flakes, magnetizing the test piece, and thereafter inspecting the test piece to determine the existence of surface flaws denoted by rotation of the flakes due to reorientation thereof by any stray fields present at defects in the test piece.

6 Claims, 5 Drawing Figures

PATENTED JAN 15 1974 3,786,346

Fig. 1 — Apply slurry of ferromagnetic flakes in oil to test piece → Magnetize test piece → Inspect 3,786,346

METHOD FOR DETECTING DEFECTS USING MAGNETIC PARTICLES IN A VISCOUS FLUID THAT RESTRICTS THEIR MOBILITY

BACKGROUND OF THE INVENTION

1. Field of the Invention

This invention is in the field of nondestructive testing of magnetizable test pieces employing a viscous slurry of ferromagnetic flakes as the detecting medium to provide improved capabilities for the magnetic particle inspection method.

2. Description of the Prior Art

The magnetic particle inspection method has a long history, going back at least as far as Hoke U.S. Pat. No. 1,426,384 which issued in 1922. Basically, the magnetic particle method of inspection is based upon the principle that an abrupt change in permeability occurs in the path of a magnetic flux flowing through a piece of magnetizable material having a defect therein resulting in the production of a local flux leakage field. If finely divided particles of ferromagnetic material are brought into the vicinity of the local leakage field, these particles offer a lower reluctance path to the leakage flux and the surrounding medium, so they tend to gather in such a field and to outline the boundaries of the field and hence the boundaries of the defects. The reluctance of the leakage field is diminished by the introduction of ferromagnetic particles in its path, and the drop in reluctance represents the energy with which the particles are moved to form the pattern and the force with which they are held in the pattern after it is formed.

Various types of inspection media have been used to apply finely divided ferromagnetic particles onto the surface of the test piece. The particles have been applied as a dry powder or in various type of liquid suspensions. One of the first types of suspensions to be used was a suspension of finely divided ferromagnetic particles in a light petroleum fraction. While these suspensions were reasonably easy to use, difficulties arose from the fact that the particles would not stay suspended in the liquid medium. An improvement along these lines is provided by the Betz U.S. Pat. No. 2,106,882 which provided a paste consisting of very finely divided magnetic particles in combination with a light petroleum oil and a dispersing agent capable of preventing agglomeration of the particles and of effecting uniform dispersion upon dilution of the paste to provide a stabilized suspending medium. Fatty acid soaps or metal soaps were found to be suitable dispersing agents. Upon dilution of the paste with the same type of light petroleum oil as used therein, a uniform dispersion of the particles resulted which prevented rapid settling in the testing bath.

While the dry particle method and the liquid suspension method have been extensively used in practice, each has its own limitations which to some extent limits the usefulness of these types of testing compositions. In both the case of the dry powder and the liquid suspension, an amount of the testing medium in excess of that actually required is applied because some of the testing composition is inevitably lost. Neither method can be effectively used with vertically oriented or overhead inspection because the particles tend to run off the surface to which they are applied. In both cases, the magnetizable particles must be applied in proper sequence to the application of the magnetizing current if accurate results are to be obtained.

The dry powder method of application has the further disadvantage that it may provide a dust which may be injurious to the eyes. Because of the particular nature of the testing medium, it cannot effectively be applied outdoors under conditions of significant wind velocity.

The wet powder inspection method sometimes has the disadvantage that it requires special lighting aids in order to discern the pattern of powdered particles in the stray fields. In addition, the wet powder inspection method is not particularly satisfactory for use on painted surfaces because of lack of adherence of the particle suspension to such surfaces.

The present invention is directed to an improved method and composition for magnetic particle testing which provides specific advantages over the dry and wet powder inspection methods as will be evident from succeeding portions of the specification.

SUMMARY OF THE INVENTION

The present invention is directed to an improvement in the magnetic particle inspection method which utilizes a relatively viscous slurry of ferromagnetic flakes as the test composition. The slurry has a consistency about that of ordinary paint, and the viscosity of the suspending medium is sufficient to restrict substantial lateral mobility of the flakes while permitting rotary movement of the flakes due to the presence of stray fields present at the defects. A suitable suspending medium is a hydrocarbon oil having a viscosity of from 100 to 500 centistokes at 25°C. The flakes themselves are preferably composed of a ferromagnetic stainless steel which are generally gray in color. Since the consistency of the slurry is important to achieve the improved results of the present invention, it is important to use not only an oily vehicle of the proper viscosity, but also the proper volumetric ratio of oil to flakes. For the purposes of this invention, it has been found that a ratio of from 6 to 20 parts by volume of a 100 to 500 centistoke viscosity oil can effectively be used for every part by volume of the flakes.

BRIEF DESCRIPTION OF THE DRAWINGS

Other objects, features and advantages of the invention will be readily apparent from the following description of certain preferred embodiments thereof, taken in conjunction with the accompanying drawings, although variations and modifications may be effected without departing from the spirit and scope of the novel concepts of the disclosure, and in which:

FIG. 1 is a flow chart of the steps involved in the process of the present invention;

DESCRIPTION OF THE PREFERRED EMBODIMENTS

In FIG. 1, it will be seen that the first stage of the process involves applying a slurry of ferromagnetic flakes in an oil vehicle to the test piece. The flakes are preferably composed of ferromagnetic stainless steel and are commercially available materials. By "flakes" I mean relatively flat platelets of metal, usually in polygonal shape in which the major dimension of the flake is at least ten times its thickness.

A relatively viscous slurry is made up consisting of the ferromagnetic flakes and a suspending medium such as a hydrocarbon oil having a viscosity of 100 to 500 centistokes at 25°C. A particularly effective suspending medium is SAE No. 30 oil which has a room temperature viscosity of 400 to 500 centistokes. The relative proportions of oil to ferromagnetic flakes may vary over the range of about 6 to 20 volumes of oil for every part by volume of the flakes. The slurry is agitated to distribute the flakes fairly uniformly through the oil and when properly formulated, the slurry has the consistency of ordinary paint.

The slurry is best applied by brushing in a relatively thin coat over the object to be tested. Spraying of the slurry may be accomplished if desired but the sensitivity of the test is improved if the sprayed coating is brushed after application.

The next step in the process, as shown in FIG. 1, consists of magnetizing the test piece in the usual manner common to magnetic particle testing. In the case of a cylindrical test piece, the test piece may be supported between a pair of pole pieces which are energized by a direct or alternating current to provide an axially extending magnetic field throughout the piece. In the presence of defects, the magnetic flux flowing through the magnetizable material results in the production of a local flux leakage field and it is this leakage field which is responsible for reorienting the flakes in the suspension.

Finally, the test piece is inspected under ordinary light. The leakage fields around flaws cause the relatively immobile flakes to rotate, and render the flakes contrastingly visible to the background because of edgewise rotation of the flakes, the flake edges being poor reflectors of light so that the defect shows up as a dark line on a gray background.

Figure 2:
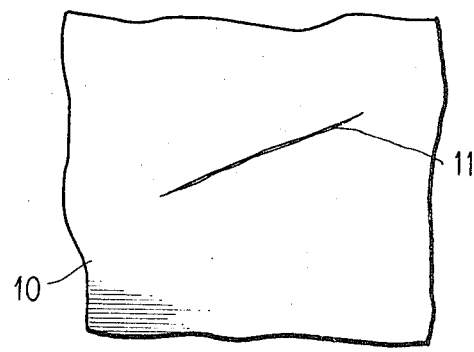
FIG. 2 is a highly magnified view of a portion of a test surface including a flaw therein.
Figure 3:
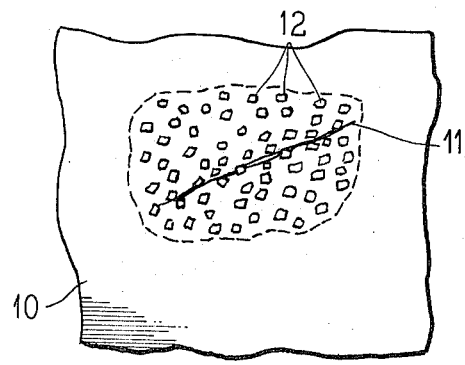
FIG. 3 is a view similar to FIG. 2 illustrating in somewhat diagrammatic manner the condition of the test piece after the slurry of magnetic flakes has been applied thereover.

The steps involved have been diagrammatically illustrated in FIGS. 2 to 5. In FIG. 2, reference numeral 10 indicates a magnetizable workpiece having a flaw indicated at reference numeral 11 contained therein. Application of the slurry of the present invention results in the deposition of ferromagnetic flakes 12 uniformly over the surface of the piece being tested as illustrated in FIG. 3. The size of the flakes has been somewhat exaggerated for purposes of illustration, as the flakes normally will have a maximum dimension of less than 100 microns.

Figure 4:
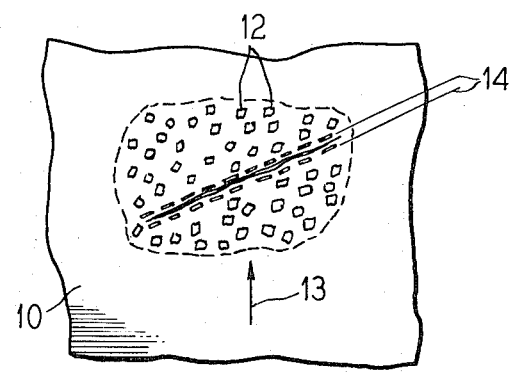
FIG. 4 is a view similar to FIG. 3, but illustrating the manner in which the flakes are rotated due to the application of a magnetic field in the test piece to render the flakes visible due to their rotation.

After application of the magnetic field along a direction identified by the arrow 13 of FIG. 4, a reorientation of the flakes in the vicinity of the flaw 11 takes place, resulting from the presence of the leakage fields.

Figure 5:
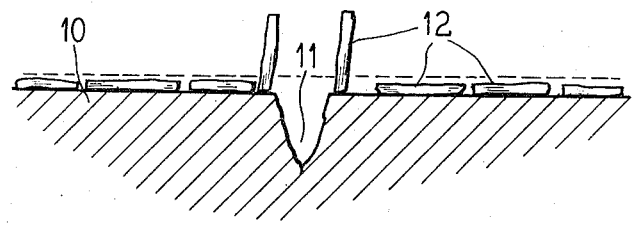
FIG. 5 is a greatly enlarged cross-sectional view illustrating somewhat schematically the reorientation of flakes due to the presence of leakage fields in the vicinity of a defect.

As illustrated in FIGS. 4 and 5, flake particles 14 which are in the immediate vicinity of the flaw 11 are rotated edgewise by the presence of the leakage field surrounding the flaw and since the flake edges are relatively poor reflectors, they appear visible to the eye as dark lines against a gray background of the testing material.

The nature of the indication depends to a significant extent upon the ratio of flakes to oil in the slurry. At a ratio of one part by volume of flakes to six parts by volume oil, there is provided a good contrast between the reoriented flakes and the background but at a slightly lower sensitivity. At a ratio of one part by volume powder to ten parts by volume oil, the sensitivity is increased in that lower magnetization levels can be used to detect the flaws, but at a sacrifice of some contrast. Increasing the flake to oil ratio to one to twenty provides additional decrease in contrast but with an increased sensitivity.

The method and compositions of the present invention can be used in environments which are not amenable to testing by means of dry powders or thin oil suspensions of ferromagnetic powder. There is no overspray problem presented, nor is there any significant hazard to the operator through the use of the new formulations. In view of the viscous, paint-like suspension which is employed, test pieces which are vertically oriented or which are overhead installations can be effectively tested by means of the new method and composition. The process requires no special lighting aids, is effective over painted surfaces and is applied prior to magnetization so that no critical sequencing of operating steps is involved.

It should be evident that various modifications can be made to the described embodiments without departing from the scope of the present invention.

I claim as my invention:

1. The method of detecting defects in a magnetizable test piece which comprises applying over the surface of said test piece a relatively viscous slurry of ferromagnetic flakes, said slurry being sufficiently viscous to restrict lateral mobility and accumulation of the flakes therein while permitting rotary movement of said flakes, magnetizing said test piece, and thereafter inspecting said test piece to determine the existence of flaws denoted by rotation of said flakes due to reorientation thereof by stray fields present at defects in said test piece.

2. The method of claim 1 in which said slurry includes an oil having a viscosity of from 100 to 500 centistokes at 25°C.

3. The method of claim 2 in which said oil is a hydrocarbon oil.

4. The method of claim 1 in which said ferromagnetic flakes are composed of a ferromagnetic stainless steel.

5. The method of claim 1 in which said slurry contains from 6 to 20 parts by volume of an oil having a viscosity of from 100 to 500 centistokes at 25°C. for every part by volume of flakes.

6. The method of claim 1 in which said slurry is applied by brushing.

\* \* \* \* \*